United States Patent
Kang et al.

(10) Patent No.: US 9,416,900 B2
(45) Date of Patent: Aug. 16, 2016

(54) INPUT/OUTPUT PIPE REINFORCING DEVICE FOR VEHICLE COMPRESSOR

(75) Inventors: Hyun-Seok Kang, Busan (KR); Sung-Hwan Kim, Jeollanam-do (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 19 days.

(21) Appl. No.: 14/364,932

(22) PCT Filed: Dec. 15, 2011

(86) PCT No.: PCT/KR2011/009680
§ 371 (c)(1),
(2), (4) Date: Jun. 12, 2014

(87) PCT Pub. No.: WO2013/089296
PCT Pub. Date: Jun. 20, 2013

(65) Prior Publication Data
US 2014/0339824 A1    Nov. 20, 2014

(51) Int. Cl.
*F16L 19/075* (2006.01)
*F16L 57/02* (2006.01)
(Continued)

(52) U.S. Cl.
CPC .............. *F16L 19/075* (2013.01); *B60T 17/043* (2013.01); *B60T 17/06* (2013.01); *F04B 39/123* (2013.01);
(Continued)

(58) Field of Classification Search
CPC .. F04C 2240/806; F04C 29/12; B60T 17/043; B60T 17/06; B60T 17/02; F16L 57/02; F16L 57/005; F16L 3/02; F16L 3/04; F16L 3/10; F16L 3/1008; F16L 41/10; F16L 41/04; F16L 41/12; F16L 41/001; F16L 31/1033; F16L 31/1075

USPC ............ 285/206, 207, 208, 209, 210, 137.11, 285/114, 115, 116, 419, 142.1; 418/15
See application file for complete search history.

(56) References Cited

U.S. PATENT DOCUMENTS 1,505,255 A * 8/1924 Gold ....................... F16L 33/04
285/114
2,265,179 A * 12/1941 MacDonald ......... H02G 3/0683
285/206

(Continued)

FOREIGN PATENT DOCUMENTS

JP    H1137074 A    2/1999
JP    3012763 B2    12/1999

(Continued)

OTHER PUBLICATIONS

International Search Report (in English and Korean) and Written Opinion (in Korean) for PCT/KR2011/009680, mailed Sep. 26, 2012; ISA/KR.

(Continued)

*Primary Examiner* — David E Bochna
(74) *Attorney, Agent, or Firm* — Harness, Dickey & Pierce, P.L.C.

(57) ABSTRACT

An inlet/outlet pipe reinforcing device for a compressor. The device includes a body unit having a first body configured to support an outer periphery of the inlet/outlet pipe and a second body having a shape corresponding to that of the first body. A hinge shaft is fixedly mounted at one longitudinal side of the body unit so as to extend in a longitudinal direction of the body unit to cause the first body and the second body to be pivotally rotated with respect to each other. A flange of the device includes a first extension part and a second expanded part.

6 Claims, 2 Drawing Sheets

(51) Int. Cl.
  *F04B 39/12*  (2006.01)
  *B60T 17/04*  (2006.01)
  *B60T 17/06*  (2006.01)
  *F16L 57/00*  (2006.01)
  *F04C 29/12*  (2006.01)

(52) U.S. Cl.
  CPC ............... *F16L 57/005* (2013.01); *F16L 57/02* (2013.01); *F04C 29/12* (2013.01); *F04C 2240/806* (2013.01)

(56) References Cited

U.S. PATENT DOCUMENTS

| | | | | |
|---|---|---|---|---|
| 4,150,848 A * | 4/1979 | Dyrup | ................... | F16L 33/23 285/414 |
| 4,301,828 A * | 11/1981 | Martin, Jr. | ............. | B60K 15/05 137/381 |
| 4,822,293 A * | 4/1989 | Robson | .................. | H01R 13/73 439/271 |
| 5,178,612 A * | 1/1993 | Fenton, Jr. | ........ | A61M 39/0208 285/136.1 |
| 5,234,185 A * | 8/1993 | Hoffman | ................... | F16L 5/14 248/56 |
| 5,347,084 A * | 9/1994 | Roney | ................... | G02B 6/4447 174/92 |
| 5,556,138 A * | 9/1996 | Nakajima | ............... | F16L 39/00 285/124.4 |
| 5,647,612 A * | 7/1997 | Yoshida | .............. | F16L 37/1225 285/13 |
| 5,816,853 A * | 10/1998 | Buekers | ............... | G02B 6/4446 439/367 |
| 5,853,201 A * | 12/1998 | Izumi | .................... | F16L 41/086 285/208 |
| 6,070,659 A * | 6/2000 | Hosoya | ................. | F28F 9/0246 285/206 |
| 6,095,777 A * | 8/2000 | Nishihata | .............. | F04C 23/008 285/141.1 |
| 6,881,901 B2 * | 4/2005 | Egan | .................... | H02G 15/013 16/2.1 |
| 7,014,225 B1 * | 3/2006 | Goodsel | .................. | F16L 23/04 285/363 |
| 7,591,486 B2 * | 9/2009 | Butler | ................... | F16L 23/024 285/137.11 |
| 7,798,837 B1 * | 9/2010 | Gardner | ............... | G01G 23/017 174/66 |
| 8,272,670 B2 * | 9/2012 | Krug, Jr. | ................ | F16L 59/024 285/316 |
| 8,388,027 B2 * | 3/2013 | Mai | ......................... | F16L 39/00 285/208 |
| 8,430,365 B2 * | 4/2013 | Benoit | .................... | F16L 5/027 285/209 |
| 9,114,687 B2 * | 8/2015 | Dorland | ............. | B60H 1/00571 |
| 2008/0136167 A1 | 6/2008 | Heelan et al. | | |

FOREIGN PATENT DOCUMENTS

| | | |
|---|---|---|
| JP | 2002206672 A | 7/2002 |
| JP | 3876536 B2 | 1/2007 |
| KR | 100202981 B1 | 6/1999 |

OTHER PUBLICATIONS

Notification of the First Office Action issued by State Intellectual Property Office of People's Republic of China (SIPO) on Sep. 22, 2015 regarding Application No. 201180075587.7 with English translation (15 pages).

* cited by examiner ant compressed in the compressor flows in or out, the device including: a body unit including a first body configured surroundingly to support the outer periphery of the inlet/outlet pipe and a second body having a shape corresponding to that of the first body; a hinge shaft fixedly mounted at one longitudinal side of the body unit so as to extend in a longitudinal direction of the body unit to cause the first body and the second body to be pivotally rotated with respect to each other thereabout; and a flange including a first extension portion formed to extend outwardly radially from one circumferential end of the first body, a second extension portion formed on the second body to correspond to the first extension portion, and a fixing portion formed at a joint where the first extension portion and the second extension portion abuts against each other to securely fix the first body and the second body, so that the flange is coupled to the compressor.

INPUT/OUTPUT PIPE REINFORCING DEVICE FOR VEHICLE COMPRESSOR

FIELD OF THE INVENTION

The present invention relates to an inlet/outlet pipe reinforcement device of a compressor for a vehicle. More particularly, the present invention relates to an inlet/outlet pipe reinforcement device of a compressor for a vehicle, which enables a connection portion between a compressor and an inlet/outlet pipe to be encircled by a body unit pivotally rotated about a hinge shaft and then to be securely fixed to the compressor so that the connection portion can be prevented from being damaged or deformed due to a load transmitted from the outside and a vibration of a vehicle engine.

BACKGROUND OF THE INVENTION

In general, a compressor driven by an engine mounted on a vehicle is a device that compresses a low-pressure refrigerant to a high-pressure refrigerant. The high-pressure refrigerant is transferred to a condenser and then is re-circulated in the compressor via an evaporator to cause air to be cooled.

FIG. 1 is a perspective view showing a state in which a compressor and an inlet/outlet pipe are connected to each other in accordance with the prior art.

As shown in FIG. 1, a compressor 3 is configured such that it is connected to an inlet/outlet pipe 5 to allow a compressed refrigerant to be transferred to an air-conditioning system (not shown).

Such a compressor 3 is often installed in close proximity to a vehicle engine to allow a refrigerant to be compressed by a driving force of the engine. In this case, the inlet/outlet pipe 5 is directly coupled to a body of the compressor 3 by a coupling method such as welding or the like. However, this coupling method entails a problem in that it is susceptible to a great vibration caused by the drive of the engine.

In other words, a vibration of the engine and an external relative load, which are transferred to the compressor 3 and the inlet/outlet pipe 5, respectively, act as shearing forces to the connection portion C between the compressor 3 and the inlet/outlet pipe 5. When the external load and the vibration caused by the drive of the engine continue to be accumulated in the connection portion C, damage and deformation of the connection portion C are caused, leading to a problem such as a leakage of the refrigerant. Particularly, this problem becomes more serious when a great working load occurs as in heavy construction equipment and the vibration of the engine is severe.

DETAILED DESCRIPTION OF THE INVENTION

Technical Problems

Accordingly, the present invention has been made to solve the aforementioned problem occurring in the prior art, and it is an object of the present invention to provide an inlet/outlet pipe reinforcement device of a compressor for a vehicle, which enables the connection portion between the compressor and an inlet/outlet pipe to be encircled by a body unit pivotally rotated about a hinge shaft and then to be securely fixed to the compressor so that the connection portion can be prevented from being damaged or deformed due to a vibration of a vehicle engine.

Technical Solution

To accomplish the above object, in accordance with an embodiment of the present invention, there is provided an inlet/outlet pipe reinforcement device of a compressor connected to a vehicle engine, the inlet/outlet pipe reinforcement device being provided at a connection portion between the compressor and an inlet/outlet pipe through which a refriger- In addition, the fixing portion may include: a first hook provided at one end of the joint where the first extension portion and the second extension portion abuts against with each other; and a second hook provided at the other end of the joint where the first extension portion and the second extension portion abuts against with each other, the second hook having a shape corresponding to the first hook so as to be fastened to the first hook.

In addition, the first extension portion and the second extension portion may further include a projection formed protrudingly outwardly from a portion where the fixing portion is positioned, the first hook may have a first groove formed on the inner surface thereof along a longitudinal direction of the body unit, the second hook has a second groove formed on the inner surface thereof to have a shape corresponding to that of the first groove, and the compressor and the flange may be fastened to each other by a bolt through a hole that is defined by the first groove and the second groove.

Further, each of the first body and the second body may further include a vibration absorption member provided on the inner peripheral surface thereof to abut against the inlet/outlet pipe 5.

Also, each of the first body 110 and the second body 120 may have a tapered face formed at the other circumferential end thereof so as to be inwardly inclined.

Moreover, each of the projection of the first extension portion and the projection of the second extension portion may have a coupling recess formed on one side thereof; and a washer is provided between the bolt and the projection, the washer having coupling protrusions formed on the underside thereof so as to be inserted into the coupling recesses.

Advantageous Effect

The inlet/outlet pipe reinforcement device of a compressor for a vehicle in accordance with an embodiment of the present invention as constructed above has the following advantages.

According to the present invention, the connection portion between the compressor and the inlet/outlet pipe are encircled by the body unit pivotally rotated about the hinge shaft and are securely fixed to the compressor so that the connection portion can be prevented from being damaged or deformed due to a vibration of a vehicle engine, thereby improving durability of the compressor and the inlet/outlet pipe.

In addition, the inlet/outlet pipe reinforcement device is implemented in a comparatively simple configuration so that it can be applied to compressors of a variety of kinds of vehicles, including a heavy vehicle, and the like.

BRIEF DESCRIPTION OF THE DRAWINGS

The above objects, other features and advantages of the present invention will become more apparent by describing the preferred embodiments thereof with reference to the accompanying drawings, in which.

Figure 1:
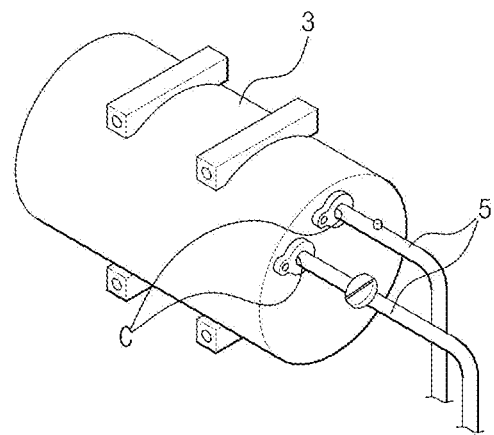
FIG. 1 is a perspective view showing a state in which a compressor and an inlet/outlet pipe are connected to each other in accordance with the prior art.

*Explanation on reference numerals of main elements in the drawings*

| | |
|---|---|
| 1: inlet/outlet pipe reinforcement device of compressor for vehicle | |
| 3: compressor | 5: inlet/outlet pipe |
| 100: body unit | 110: first body |
| 112, 122: receiving groove | 120: second body |
| 130: vibration absorption member | 140: tapered face |
| 200: flange | 210: first extension portion |
| 220: second extension portion | 230: fixing portion |
| 232: first hook | 234: second hook |
| 240: projection | 250: hole |
| 260: coupling recess | 242: first groove |
| 244: second groove | 300: hinge shaft |
| 400: bolt | 500: washer |
| 510: coupling protrusion | |
| C: connection portion C between compressor and inlet/outlet pipe | |

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
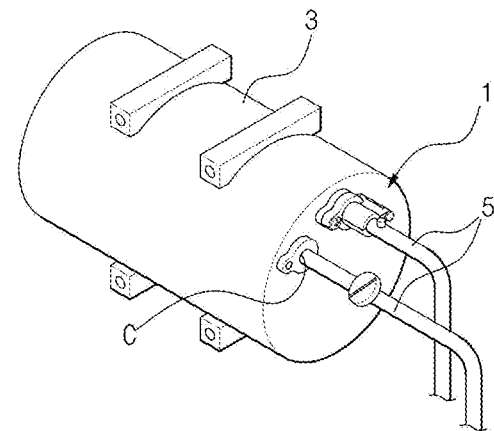
FIG. 2 is a perspective view showing a state in which an inlet/outlet pipe reinforcement device of a compressor for a vehicle is mounted on the compressor in accordance with an embodiment of the present invention.
Figure 3:
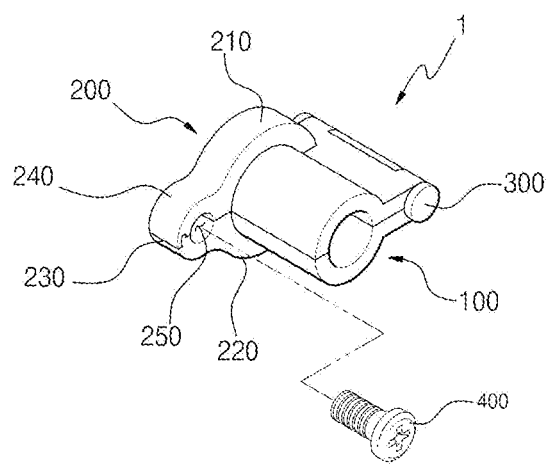
FIG. 3 is an assembled perspective view showing an inlet/outlet pipe reinforcement device of a compressor for a vehicle in accordance with an embodiment of the present invention.
Figure 4:
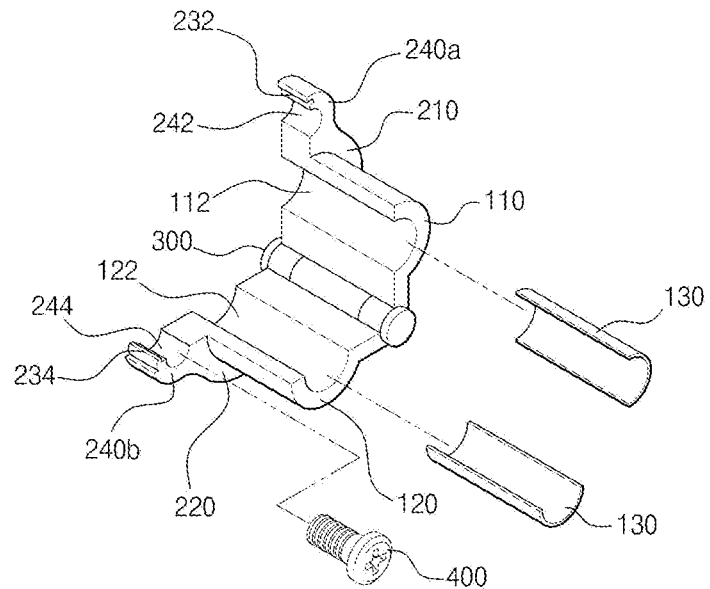
FIG. 4 is an exploded perspective view showing an inlet/outlet pipe reinforcement device of a compressor for a vehicle in accordance with an embodiment of the present invention.

FIG. 2 is a perspective view showing a state in which an inlet/outlet pipe reinforcement device of a compressor for a vehicle is mounted on the compressor in accordance with an embodiment of the present invention, FIG. 3 is an assembled perspective view showing an inlet/outlet pipe reinforcement device of a compressor for a vehicle in accordance with an embodiment of the present invention, and FIG. 4 is an exploded perspective view showing an inlet/outlet pipe reinforcement device of a compressor for a vehicle in accordance with an embodiment of the present invention; and As shown in FIG. 2, the inlet/outlet pipe reinforcement device 1 in accordance with the present invention is provided at a connection portion C between a compressor connected to a vehicle engine (not shown) and an inlet/outlet pipe 5 through which a refrigerant compressed in the compressor 3 flows in or out, and serves to prevent the connection portion C from being damaged by a shearing force accumulated in the connection portion C due to a vibration of the vehicle engine and an external load. In this case, the size and shape of each element of the inlet/outlet pipe reinforcement device 1 may vary variously depending on the size and shape of a compressor 3 for a vehicle, on which the inlet/outlet pipe reinforcement device is to be mounted.

As shown FIGS. 3 and 4, the inlet/outlet pipe reinforcement device 1 in accordance with the present invention roughly includes a body unit 100, a flange 200, and a hinge shaft 300.

First, the body unit 100 is configured surroundingly to support the outer periphery of the inlet/outlet pipe 5. The body unit 100 includes a first body 110 and a second body 120, which generally correspond to each other in shape.

The first body 110 is an element that is configured to surroundingly support one side of the outer periphery of the inlet/outlet pipe 5. The first body 110 has a receiving groove 112 formed to a predetermined length on the inner peripheral surface thereof along the longitudinal direction thereof to have a shape corresponding to that of the outer peripheral surface of the inlet/outlet pipe 5 so that a part of the outer peripheral surface of the inlet/outlet pipe 5 can be surroundingly seated on the receiving groove 112 in such a manner as to be brought into tight contact with the surface of the receiving groove 112.

The second body 120 is an element that is coupled to the first body 110 to surroundingly support the other side of the outer periphery of the inlet/outlet pipe 5. Since the second body 120 is formed in a shape corresponding to that of the first body 110, it has a receiving groove 122 formed on the inner peripheral surface thereof to confront the receiving groove 112 of the first body 110 and has the same length as that of the first body 110.

The coupled body of the first body 110 and the second body 120, i.e., the body unit 100 is formed in a shape in which the inlet/outlet pipe 5 is surroundingly received on the inner peripheral surface thereof in such a manner as to be brought into tight contact with the inner peripheral surface thereof.

The body unit 100 can be made of the same material as that of the compressor 3 or the inlet/outlet pipe 5m and may be manufactured by injection-molding a material such as a synthetic resin that is not deformed even by a great temperature change, is lightweight, and has a high strength.

Meanwhile, the first body 110 and the second body 120 may further include a thin vibration absorption member 130 provided on the inner peripheral surfaces thereof, i.e., on the receiving grooves 112 and 122. The vibration absorption member 130 is formed of a material such as rubber, cork, wood, synthetic resin, or the like. The vibration absorption member 130 can reduce a vibration transferred to the inlet/outlet pipe 5.

The hinge shaft 300 is an element that is fixedly mounted at one longitudinal side of the body unit 100 so as to extend in a longitudinal direction of the body unit 100 to cause the first body 110 and the second body 120 to be pivotally rotated with respect to each other about the hinge shaft 300. The hinge coupling method using the hinge shaft 300 corresponds to a coupling method typically used in the art.

In an embodiment of the present invention, in a state in which one longitudinal side of the first body 110 and one longitudinal side of the second body 120 are engaged into each other, the hinge shaft 300 is fixedly inserted into the engagement portion of the first body 110 and the second body 120 to form a hinge, so that the other side of the first body 110 and the other side of the second body 120 are pivotally rotated about the hinge shaft 300 to cause the first body and the second body to be opened or closed. Thus, the first body 110 and the second body 120 can be mounted on the outer periphery of the inlet/outlet pipe 5.

The flange 200 is an element that is formed to extend outwardly radially from one circumferential end of the first body 110 so as to be coupled to the main body of the compressor 3. The flange 200 can roughly include a first extension portion 210, a second extension portion 220, and a fixing portion 230. The flange 200 is preferably made of the same material as that of the body unit 100 to protect the connection portion C. In addition, the flange 200 may be made of a metal material or may be injection-molded integrally with the body unit 100 using a material such as a synthetic resin that is lightweight and has a high strength.

In this case, the first extension portion 210 is formed to extend outwardly radially from one circumferential end of the first body 110, and the second extension portion 220 is formed on the second body 120 to have a shape corresponding to that of the first extension portion 210.

Thus, the coupling body of the first extension portion 210 and the second extension portion 220 serves to form one end of the reinforcement device 1 according to the present invention to cause the coupling body to be coupled to the main body of the compressor 3 over a wide area so that the inlet/outlet pipe 5 can be more firmly fixed to the compressor 3.

Meanwhile, the extension length, shape and thickness of the first extension portion 210 and the second extension portion 220 can vary properly in consideration of the shape of the fixing portion 230 which will be described later, a load transmitted from the outside, and a magnitude of a vibration of the engine.

The fixing portion 230 is an element that is configured to fix the first body 110 and the second body 120 in a state in which the first body 110 and the second body 120 encircle the inlet/outlet pipe 5. The fixing portion 230 is formed at a joint where the first extension portion 210 and the second extension portion 220 abut against each other in such a manner as to be positioned at the other longitudinal side of the body unit 100, which is opposite to one longitudinal side of the body unit 100 where the hinge shaft 300 is provided. The fixing portion 230 can be configured by any fixing method as long as the first body 110 and the second body 120 can be maintained in a state of abutting against each other so as to be in tight contact with each other.

In an embodiment of the present invention, the fixing portion 230 may include a first hook 232 provided at one end of a joint where the first extension portion 210 and the second extension portion 220 abuts against with each other; and a second hook 234 provided at the other end of a joint where the first extension portion 210 and the second extension portion 220 abuts against with each other. That is, when the first hook 232 is provided at one end of the first extension portion 210, the second hook 234 is provided at one end of the second extension portion 220.

The first hook 232 is formed in a concavo-convex or crooked shape, and the second hook 234 is formed in a concavo-convex or crooked shape corresponding to that of the first hook 232, so that when a lateral pressure of more than a certain strength is applied to the first extension portion 210 and the second extension portion 220, the first hook 232 and the second hook 234 are fittingly coupled to each other in a state of being in tight contact with each other. As a result, the first body 110 and the second body 120 are fixedly mounted on the outer peripheral surface of the inlet/outlet pipe 5.

As such, the fixed body unit 100 is securely fixed to the main body of the compressor 3 by a coupling method such as welding, bolt fastening or the like over a wide area through the flange 200 formed to extend at one circumferential end of the body unit 100, so that the connection portion C between the compressor 3 and the inlet/outlet pipe 5 can be reinforcingly supported by the body unit 100.

The reinforcement device 1 in accordance with the present invention is configured such that the connection portion between the compressor 3 and the inlet/outlet pipe 5 is encircled by the body unit pivotally rotated about a hinge shaft to allow the compressor 3 and the inlet/outlet pipe 5 to be vibrated integrally and to reinforcingly support the connection portion C, so that a shearing force on the connection portion C caused by a vibration of the engine and an external load can be effectively reduced. For this reason, the durability of the compressor 3 and the inlet/outlet pipe 5 can be remarkably improved.

Furthermore, the fixing portion 230 in accordance with the present invention may further include a projection 240, a first groove 242, and a second groove 244.

The projection 240 is an element that provides a space to allow the reinforcement device 1 to be fasteningly fixed to the compressor 3 by means of a bolt 400. The projection 240 is formed by allowing the first extension portion 210 and the second extension portion 220 to be protruded outwardly from a portion where the first hook 232 and the second hook 234, i.e., the fixing portion 230 is positioned.

At this time, the first groove 242 is a groove that is formed on the inner surface of the first hook 232 along the longitudinal direction of the body unit 100, and the second groove 244 is groove that is formed on the inner surface of the second hook 234 to have a shape corresponding to that of the first groove 242.

A bolt 400 is inserted into a hole 250 defined by the first groove 242 and the second groove 244 that confront each other to cause the reinforcement device 1 to be bolt-coupled to the compressor so that the main body of the compressor 3 and the flange 200 are securely fixed to each other.

This bolt coupling additionally performs a function of fixing the first body 110 and the second body 120 since a head portion of the bolt 400 is fixed onto a projection 240a of the first extension portion 210 and a projection 240b of the second extension portion 220.

Since a method of fixedly coupling the reinforcement device 1 in accordance with the present invention to the compressor 3 by bolt coupling is performed in a simple and easy manner, the reinforcement device 1 can be easily applied to the compressor 3 for a variety of kinds of vehicles, including a heavy vehicle and the like.

Figure 5:
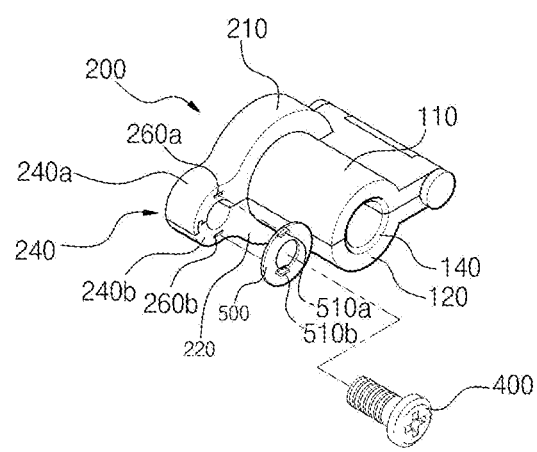
FIG. 5 is an assembled perspective view showing a modification of an inlet/outlet pipe reinforcement device of a compressor for a vehicle in accordance with an embodiment of the present invention.

FIG. 5 is an assembled perspective view showing a modification of an inlet/outlet pipe reinforcement device of a compressor for a vehicle in accordance with an embodiment of the present invention.

As shown in FIG. 5, each of the first body 110 and the second body 120 may have a tapered face 140 formed at the other circumferential end thereof, which is opposite to one circumferential end thereof where the flange 200 is formed, so as to be inwardly inclined.

The connection portion C of the compressor 3 and the inlet/outlet pipe 5, which is coupled by welding through the reinforcement device 1 in accordance with the present invention, is protected from a vibration of a vehicle engine and an external load. On the other hand, an inner edge of the other circumferential end (which is opposite to a position where the flange is formed) of the first body 110 and the second body 120 and one side of the inlet/outlet pipe 5 abutting against the inner edge may be damaged due to the vibration of the engine.

Thus, the tapered face 140 is formed at the inner edge of the other circumferential end of the first body 110 and the second body 120 by a chamfering process.

The tapered face 140 prevents the contact by a vibration between the inner edge of other circumferential end of the first and second bodies 110 and 120 and one side of the inlet/outlet pipe 5 abutting against the inner edge so that damage and deformation such as flexure (or bending) of the inlet/outlet pipe 5 can be prevented.

In addition, coupling recesses 260a and 260b are respectively formed at one side of the top surface of the projection 240a of the first extension portion 210 and at one side of the top surface of the projection 240b of the second extension portion 220, which abut against the head portion of the bolt 400. A washer 500 having coupling protrusions 510a and 510b formed on the underside thereof is provided between the bolt 400 and the projection 240 so as to be inserted into the coupling recesses 260a and 260b.

The coupling protrusions 510a and 510b of the washer 500 are respectively inserted into the coupling recesses 260a and 260b formed in the projection 240 so that the first extension portion 210 of the first body 110 and the second extension portion 220 of the second body 120 more securely fix the outer periphery of the inlet/outlet pipe 5 in such a manner as to surround the outer periphery of the inlet/outlet pipe 5.

The inlet/outlet pipe 5 abutting against the inner edge of the other circumferential end of the first body 110 and the second body 120 is prevented from being damaged and broken by the tapered face 140 as a modification of the reinforcement device 1 in accordance with the present invention as described above. In addition, the coupling protrusions 510a and 510b formed on the washer 500 are fixedly inserted into the coupling recesses 260a and 260b formed in the projections 240 so that the first extension portion 210 of the first body 110 and the second extension portion 220 of the second body 120 can be more securely fixed.

INDUSTRIAL APPLICABILITY

As described above, according to the inlet/outlet pipe reinforcement device of a compressor for a vehicle of the present invention as constructed above, the connection portion between the compressor and the inlet/outlet pipe are encircled by the body unit pivotally rotated about the hinge shaft and then are securely fixed to the compressor so that the connection portion can be prevented from being damaged or deformed due to a vibration of a vehicle engine and a load transmitted from the outside.

The invention claimed is:

1. A reinforcement device in combination with a compressor and an inlet/outlet pipe, the device comprising:
    a body unit including a first body configured surroundingly to support the outer periphery of the inlet/outlet pipe and a second body having a shape corresponding to that of the first body;
    a hinge shaft fixedly mounted at one longitudinal side of the body unit so as to extend in a longitudinal direction of the body unit to cause the first body and the second body to be pivotally rotated with respect to each other thereabout; and
    a flange including a first extension portion formed to extend outwardly radially from one circumferential end of the first body, a second extension portion formed on the second body to correspond to the first extension portion, and a fixing portion formed at a joint where the first extension portion and the second extension portion abuts against each other to securely fix the first body and the second body, so that the flange is coupled to the compressor.

2. The reinforcement device according to claim 1, wherein the fixing portion comprises:
    a first hook provided at one end of the joint where the first extension portion and the second extension portion abuts against with each other; and
    a second hook provided at the other end of the joint where the first extension portion and the second extension portion abuts against with each other, the second hook having a shape corresponding to the first hook so as to be fastened to the first hook.

3. The reinforcement device according to claim 2, wherein the first extension portion and the second extension portion further comprise a projection formed protrudingly outwardly from a portion where the fixing portion is positioned,
    the first hook has a first groove formed on the inner surface thereof along a longitudinal direction of the body unit,
    the second hook has a second groove formed on the inner surface thereof to have a shape corresponding to that of the first groove, and
    the compressor and the flange are fastened to each other by a bolt through a hole that is defined by the first groove and the second groove.

4. The reinforcement device according to claim 3, wherein each of the projection of the first extension portion and the projection of the second extension portion has a coupling recess formed on one side thereof; and
    a washer is provided between the bolt and the projection, the washer having coupling protrusions formed on the underside thereof so as to be inserted into the coupling recesses.

5. The reinforcement device according to claim 1, wherein each of the first body and the second body further comprises a vibration absorption member provided on the inner peripheral surface thereof to abut against of the inlet/outlet pipe.

6. The pipe reinforcement device according to claim 1, wherein each of the first body and the second body has a tapered face formed at a circumferential end thereof so as to be inwardly inclined.

* * * * *